No. 813,109. PATENTED FEB. 20, 1906.
R. A. NORLING.
PNEUMATIC HAMMER.
APPLICATION FILED FEB. 17, 1905.

Witnesses:
Edw. P. Barrett
H. R. Wilkins

Inventor
Reinhold A. Norling
by Poole & Brown
his Attys.

No. 813,109. PATENTED FEB. 20, 1906.
R. A. NORLING.
PNEUMATIC HAMMER.
APPLICATION FILED FEB. 17, 1905.

Witnesses:
Edw. R. Berritt
E. R. Wilkins

Inventor
Reinhold A. Norling
by Poole & Brown
his Atty's.

UNITED STATES PATENT OFFICE.

REINHOLD A. NORLING, OF AURORA, ILLINOIS, ASSIGNOR TO AURORA AUTOMATIC MACHINERY COMPANY, OF AURORA, ILLINOIS, A CORPORATION OF ILLINOIS.

PNEUMATIC HAMMER.

No. 813,109.      Specification of Letters Patent.      Patented Feb. 20, 1906.

Application filed February 17, 1905. Serial No. 246,146.

*To all whom it may concern:*

Be it known that I, REINHOLD A. NORLING, a citizen of the United States, residing at Aurora, in the county of Kane and State of Illinois, have invented certain new and useful Improvements in Pneumatic Hammers; and I do hereby declare that the following is a full, clear, and exact description thereof, reference being had to the accompanying drawings, and to the letters of reference marked thereon, which form a part of this specification.

This invention relates to a pneumatic tool in the nature of a portable pneumatic hammer or device of that class embracing a barrel or cylinder, a piston or plunger adapted to slide therein, and a controlling-valve through which the air or other fluid under pressure is admitted to and permitted to escape from the opposite ends of the cylinder or barrel to give reciprocatory movement to the plunger therein.

The tool illustrated in the accompanying drawings is designed for use as a riveting-hammer; but the same features of construction illustrated in said drawings and herein claimed may be employed in a tool used for chipping or other purposes.

The invention consists in the matters hereinafter described, and more particularly pointed out in the appended claims.

As shown in the accompanying drawings.

As shown in said drawings, A indicates the working cylinder or barrel of the tool, B the sliding piston therein, C a handle which is made integral with the inner end of the cylinder A. The said cylinder A is originally provided with a bore extending through the same from end to end, and said bore is closed at the inner end of the cylinder by means of a plug D, inserted in the inner end of the bore and secured therein, preferably by a screw-threaded connection. In the inner end of the barrel adjacent to the handle and arranged generally parallel therewith is a transversely-arranged throttle-valve which passes through the plug D and the parts of the barrel adjacent thereto. On one side of the cylinder at its inner end is located an extension or projection forming a valve-casing A' of a controlling-valve. Said controlling-valve embraces a valve-bushing E and a valve-piston F. Said bushing and piston are cylindric and arranged with their central axes parallel with the central axis of the cylinder or barrel.

The controlling-valve chamber is formed by the bore of the bushing E and is closed at its outer end by the integral inner end wall of the casing A' and at its inner end, or that adjacent to the handle, by means of a circular plate or diaphragm G, which is clamped or held in contact with the adjacent end of the bushing E by means of a screw-threaded thimble G', having exterior screw-threads engaging interior screw-threads in the said valve-casing. Said thimble G' is adapted to bear at its inner edge against the plate G, so as to clamp said plate against the adjacent end margin of the bushing E. Said thimble G' is slit or severed at one point and is provided with oppositely-inclined interior conical surfaces *g g'*. Within said thimble and projecting from the outer end thereof is a tube G², having at its inner end an exterior conical surface adapted to fit the interior conical surface $g'$ of the thimble G'. The outer end of said tube G² is made cylindric and screw-threaded and is surrounded by a nut G³, having at its inner end a conical exterior surface adapted to fit the conical surface $g'$ of the said thimble. Said nut has at its outer end a flat-sided flange by which it may be turned. After the thimble G' is brought into bearing against the edge of the plate G the nut G³ may be tightened on the sleeve G', so as to draw the conical surfaces of said sleeve and nut into the conical bearing-surfaces $g$ $g'$ of said sleeve, thereby expanding the thimble in the surrounding wall of the valve-casing and rigidly holding the sleeve in place.

H is a tool-carrying spindle which is mounted in the outer end of the barrel and projects into the same in position for contact with its inner end of the plunger B. Said tool-spindle H is shown as being arranged to slide in a guide-aperture formed in a bushing H', which is secured in a cylindric aperture in the outer end of the barrel, said spindle having a limited endwise sliding movement in said bushing, as is common in like tools. The spindle is shown as provided at its outer end with a riveting-head H², which in the instance illustrated constitutes the tool referred to. For limiting the endwise movement of the spindle H in the barrel the latter is shown as having attached to it a stop-plate I of segmental form, which projects beyond the end of the barrel and is provided with an inwardly-extending flange $i$, that projects into a space or groove formed between two shoulders $h$ $h'$ on the head H². Said shoulders $h$ $h'$ are adapted for contact with the flange $i$ and are spaced at such distance apart as to afford the required extent of endwise movement in said spindle H. The segmental stop-plate I is shown as secured to the end of the barrel by means of an annular groove $a$ in the barrel, which is engaged by a ring I', to which the stop-plate I is rigidly secured.

Now, referring to the construction of the throttle-valve illustrated in the drawings, the transverse bore or passage in which the throttle-valve is located opens at its ends through the outer surfaces of the opposite side walls of the cylinder, and one end of said bore constitutes a supply passage or inlet for the air or other fluid under pressure. In said inlet end of the bore or passage is inserted a sleeve or nipple J, having interior screw-threads for attachment thereto of the pipe or hose through which air is supplied to the tool. This nipple has external screw-threads engaging the corresponding screw-threads in the end of said bore or passage, which is enlarged to receive it. Within said bore or passage is located a tubular valve-bushing K, which extends through the plug D and into the wall of the cylinder at either side of said plug. Within said bushing is arranged longitudinally a valve-stem L. At the inlet end of said bore or passage said valve-stem L is provided with a valve-disk $l$, adapted to bear against a valve-seat formed on the adjacent end of the bushing K. The opposite end of said valve-stem extends through and fits closely within a guide-aperture $k$, formed in the end of the valve-bushing remote from the air-inlet. Said valve-stem is adapted for contact with an arm $m$ on an actuating-lever or trigger M, pivotally mounted on the handle. The thimble J is provided at its inner end with a rigidly-attached central guiding-ring $j$, through which passes the adjacent end of the valve-spindle L, and between said ring $j$ and the valve-disk $l$ is located a coiled actuating-spring L', by which the valve-disk is held normally against its seat. The bushing K is provided between its ends with outlet-ports $k'$ $k'$, which communicate with oblique passages O O', leading to the controlling-valve chamber. The valve-disk L when in contact with its seat shuts off communication between the air-supply passage and the interior of the valve-bushing. The valve may be opened by endwise pressure of the trigger-arm $m$ against the said valve-spindle L, operating to open the valve against the tension of the spring L' and the air-pressure acting on the valve-disk.

Provision is made for locking the trigger from movement when in position to leave the valve closed, as follows: N is an endwise-sliding locking-bar mounted in a guide-passage $c$, formed in the handle C adjacent to the pivoted end of the trigger M, the outer end of said locking-bar being arranged to extend beyond the outer face of the handle in its part which is gripped by the hand. Said locking-bar N is held in the outward limit of its movement by a coiled spring N', located in the guide-passage $c$ and pressing on the inner end of the bar N in such manner as to hold the outer end of said bar normally protruded from the outer face of the handle. Endwise movement of said locking-bar in both directions is, as shown, limited by means of a stop-pin $c'$, extended transversely through the handle and engaging a notch $n$ in the locking-bar. Said locking-bar is provided on its inner face, adjacent to the trigger M, with a notch $n'$, and the trigger is provided with a lug $m'$, which is adapted to enter said notch $n'$ when the locking-bar is thrust inwardly against the action of the spring N', but is adapted for contact with the side face of the inner end portion of said locking-bar when the latter is thrown outwardly or in its normal position, the said lug $m'$ and the opposed face of the locking-bar being so arranged that they will be engaged with each other when the trigger stands in its normal position or with the throttle-valve closed. When the handle C is grasped by the operator, the locking-bar N will be thrust inwardly by pressure of the hand thereon, thereby bringing the notch $n'$ opposite the lug $m'$ and releasing the trigger M, so that it may be moved by the pressure of the hand or fingers to open the throttle-valve.

Figure 2:
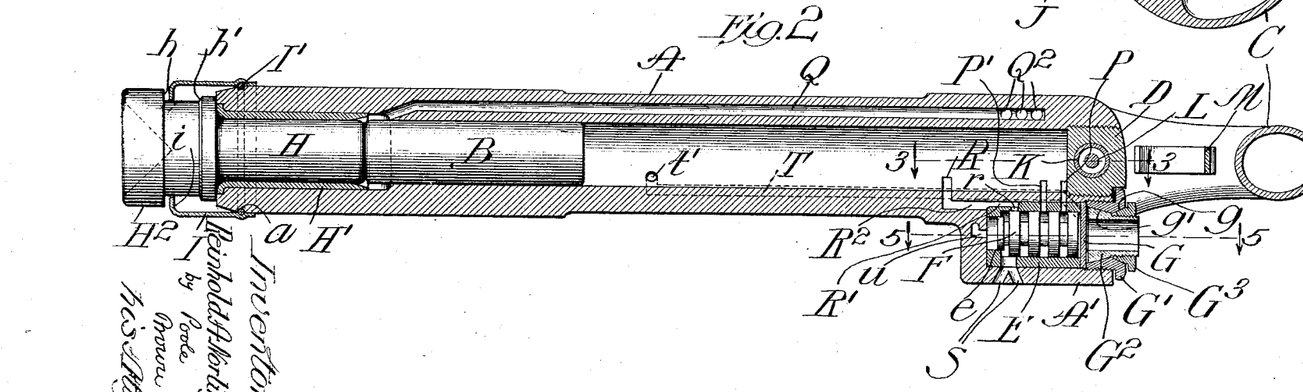
Fig. 2 is a central longitudinal section of the same, taken transversely through the throttle-valve and through the central axis of the controlling-valve on the line 2 2 of Fig. 1.
Figures 3, 4:
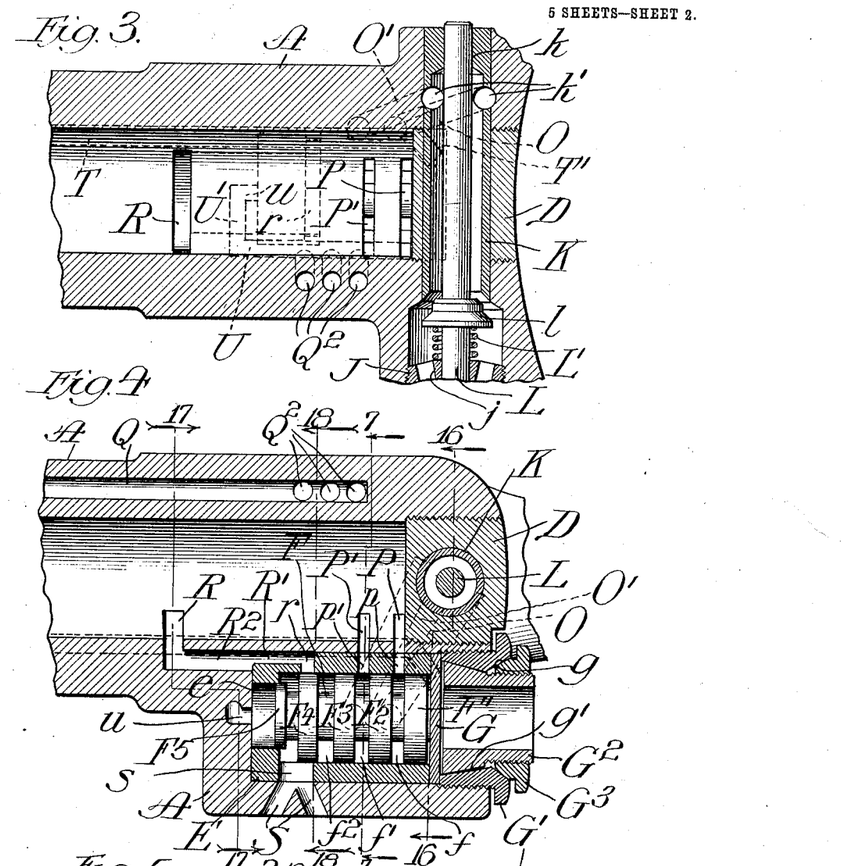
Fig. 3 is an enlarged detail section taken upon line 3 3 of Fig. 2 and showing the throttle-valve and adjacent parts.
Fig. 4 is a like enlarged detail section taken on line 4 4 of Fig. 1.
Figure 5:
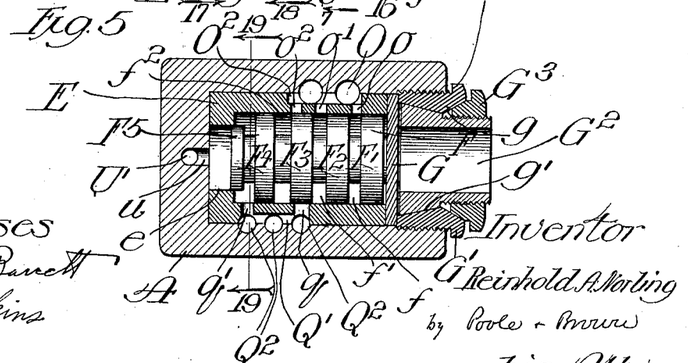
Fig. 5 is an enlarged detail longitudinal section through the controlling-valve, taken on line 5 5 of Fig. 2.
Figure 6:
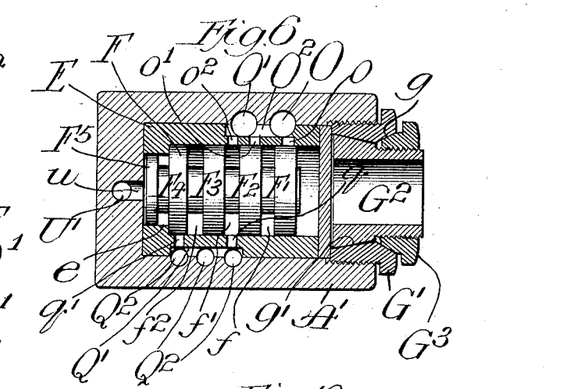
Fig. 6 is a section like Fig. 5, showing the valve-piston in a changed position.
Figure 7:
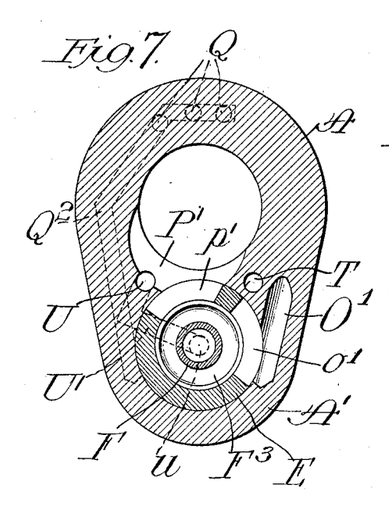
Fig. 7 is a detail cross-section taken through the controlling-valve and barrel upon line 7 7 of Figs. 4 and 15.
Figure 8:
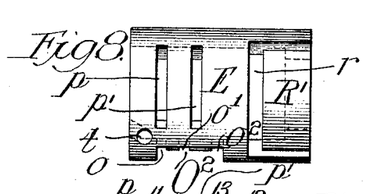
Figs. 8, 9, and 10 are views in side elevation of the controlling-valve bushing.
Figure 9:
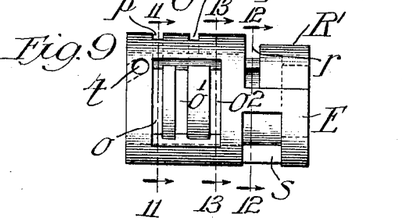
Figure 10:
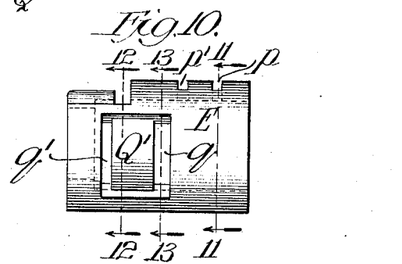
Figure 11:
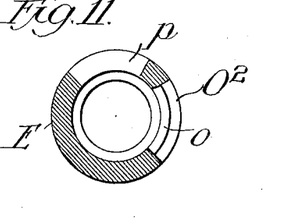
Figs. 11, 12, and 13 are sectional views of said controlling-valve bushing, taken upon lines 11 11, 12 12, and 13 13 of Figs. 9 and 10.
Figure 12:
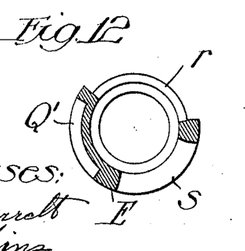
Figure 13:
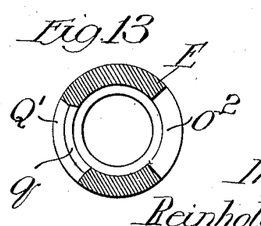
Figure 19:
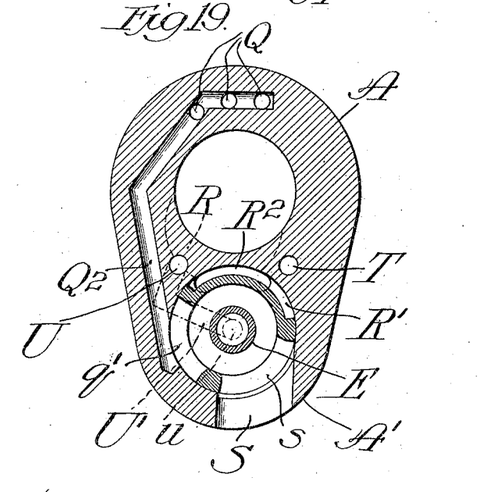
Fig. 19 is a detail cross-section taken upon line 19 19 of Fig. 5.

Now, referring to the details of construction illustrated in the controlling-valve, the means for actuating the same, and the ports or passages connecting said valve with the interior of the cylinder, these parts are made as follows: First referring to the construction of the valve-bushing E, said bushing is interiorly cylindric throughout the greater part of its length, and at its outer end, or that remote from the plate G, is provided with a reduced cylindric part $e$, which is smaller in diameter than the main portion of the bushing. The valve-piston F is provided with annular enlargements or flanges $F'$ $F^2$ $F^3$ $F^4$ of equal diameter, separated by grooves or recesses $f$ $f'$ $f^2$ and adapted to fit and slide within the larger cylindric part of the valve-bushing. At its outer end the said valve-piston is provided with a cylindric part $F^5$ of less diameter than the main part of the piston and which slides within the smaller end portion $e$ of the valve-bushing. In the said valve-bushing are formed three ports $o$ $o'$ $o^2$, which communicate with a recess $O^2$, Figs. 5 and 6, formed by cutting away part of the outer surface of the valve-bushing, as clearly seen in Figs. 8 and 9. Said recess $O^2$ is in communication with the two supply-passages O O', which extend from the ports $k'$ $k'$ of the throttle-valve bushing K obliquely through the wall of the cylinder to the said recess. The first and second ports $o$ $o'$ constitute inlet-ports through which air is supplied to the inner end of the cylinder. The third port $o^2$ constitutes an inlet-port to supply air to the outer end of the cylinder. The said ports $o$ $o'$ are so arranged that when the valve-piston is at the inward limit of its movement they will be opposite the grooves $f$ $f'$ or between the enlargements $F'$ $F^2$ $F^3$ of said piston, while the port $o^2$ is so located that in this position of the valve-piston it will be opposite or closed by the enlargement $F^3$, as clearly seen in Figs. 4 and 5. Said valve-bushing is also provided with two supply-ports $p$ $p'$, communicating with cylinder admission-passages P P', which open into the inner end of the cylinder. Said ports $p$ $p'$ are arranged or so located as to come opposite the annular grooves $f$ $f'$ when the piston is at the inward limit of its movement, as seen in Figs. 4 and 5. Said grooves $f$ $f'$, with the ports $o$ $o'$ and ports $p$ $p'$, Fig. 7, serve to connect the supply-passage with the inner end of the cylinder when the piston is at the inward limit of its movement, thereby admitting the pressure fluid to the inner end of the cylinder for forcing the plunger therein outward. The said bushing E is also provided with two ports $q$ $q'$, constituting the admission and exhaust ports for the outer end of the cylinder. Said ports $q$ $q'$ communicate with a recess $Q'$, formed by cutting away part of the outer surface of the bushing, as seen in Figs. 5, 6, 10, 13, and 19. The said recess $Q'$ is in communication with transverse passages $Q^2 Q^2 Q^2$, which, as shown in Fig. 19, communicate with longitudinal passages Q Q Q, which extend through the wall of the cylinder, and, as seen in Fig. 2, communicate with the interior of the same at its outer end. The port $q$, recess $Q'$, passages $Q^2$, and passages Q, Figs. 2 and 5, afford communication between the controlling-valve and the outer end of the cylinder, by means of which the pressure fluid is admitted to the said outer end of the cylinder for the purpose of driving the piston or plunger inwardly. The said passages Q, recess $Q'$, and exhaust-port $q'$ serve to convey the exhaust from the outer end of the cylinder to the controlling-valve. The ports $o^2$ and $q$ are both adapted to coact with the enlargement $F^3$ and groove $f'$ of the valve-piston, the arrangement thereof being such that both the said ports $o^2$ and $q$ are covered and closed by the enlargement $F^3$ when the piston is at the outward limit of its movement, as seen in Fig. 5, and are opposite the groove $f'$ when the piston is at the inward limit of its movement, as seen in Fig. 6. When the piston is in this latter position, pressure fluid passes from the supply-passages O O', through the port $o^2$, the groove $f'$, the port $q$, passages $Q^2$, and the passages Q, to the outer end of the cylinder.

The bushing E is also provided with an exhaust-port $r$, communicating with a recess $R'$, formed by cutting away a part of the end portion of the bushing and which communicates by a longitudinal passage $R^2$ with the exhaust-port R for the inner end of the cylinder, said port being located at some distance from the admission-ports. The port $r$ is so located that it will be opposite and closed by the enlargement portion $F'$ of the valve-piston when the latter is at the inward limit of its movement, as seen in Figs. 4 and 5, but will communicate with the groove $f^2$ between the enlargements $F^3$ and $F^4$ when the piston is at the outward limit of its movement, as seen in Fig. 6. Said valve-bushing E is provided with a main exhaust-port $s$, arranged near the inner end of the said bushing and which is of such width or dimension, measured lengthwise of the bushing, as to cover the space occupied by the ports $q'$ and $r$. When the valve-piston is at the inward limit of its movement, as seen in Figs. 4 and 5, and the port $q'$ is uncovered by the enlargement $F^4$, said port $q'$ will be in communication with the exhaust-port $s$, Fig. 19, so that the exhaust from the outer end of the cylinder will pass through the space between the said enlargement F⁴ and the adjacent end of the valve-bushing to said main exhaust-port s. When the valve-piston is shifted to the outward limit of its movement or to the position seen in Fig. 6, the port r will be brought into communication with the exhaust-port s by the groove f², Fig. 18, and the exhaust from the inner end of the cylinder will pass from the cylinder exhaust-port R, through the exhaust-port r and the groove f², to the main exhaust-port s. Said main exhaust-port s communicates with exhaust-passages S S, formed in the outer wall of the valve-casing and opening to the outer air.

From the above it will be uuderstood that when the valve-piston F is at the outward limit of its movement pressure fluid will be admitted by the supply-passages O O' to the passages Q Q, leading to the outer end of the cylinder, and when said valve-bushing is at the inward limit of its movement the exhaust from the inner end of the cylinder will pass from the exhaust-port R to the exhaust-port S and that the pressure fluid is admitted to the inner end of the cylinder when the valve-piston is at the inward limit of its movement by the connection of the passages O O' with supply-ports P P' through the ports o o', grooves f f', and ports p p', and communication is at the same time established between the passages Q Q, leading to the outer end of the cylinder and the main exhaust-port s through the exhaust-port q and the space at the inner end of the valve-bushing, as hereinbefore set forth.

Figure 1:
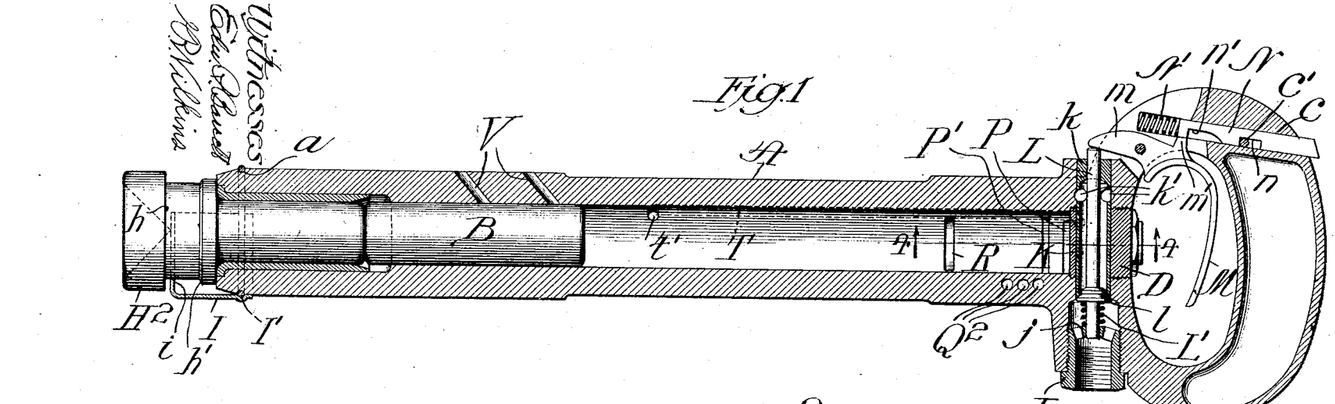
Figure 1 is a view in central longitudinal section of a tool embodying my invention, taken through the central axis of the throttle-valve.
Figure 14:
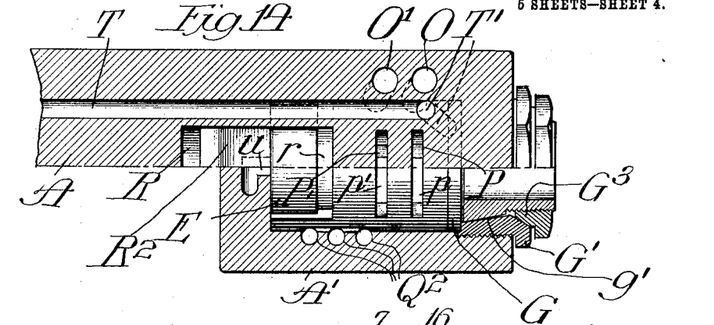
Fig. 14 is a detail longitudinal section taken upon the indirect line 14 14 of Fig. 16.
Figure 16:
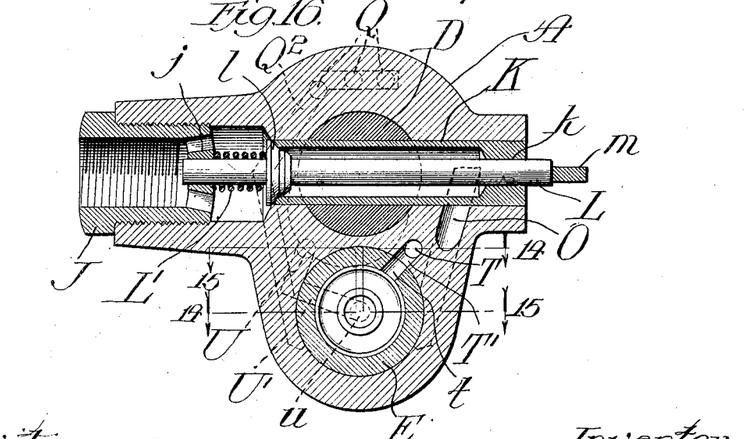
Fig. 16 is a detail cross-section taken on line 16 16 of Figs. 4 and 15.

Now, referring to means shown for shifting or giving endwise movement to the valve-piston, this is accomplished generally by air-pressure from the supply-pipe acting in the inner end of the valve-chamber on the larger part F' of the valve-piston to move the same outwardly and by pressure of air compressed in the inner end of the cylinder by the back stroke of the plunger acting on the smaller end F⁵ of said valve-piston to move the same inwardly. For thus giving movement to the valve-piston a longitudinal passage T, Fig. 14, is formed in the wall of the cylinder and communicates at the inner end thereof by an oblique passage T' with the space between the inner enlargement F' of the valve-piston and the plate G, which forms the end wall of the valve-chamber. Said passage T' communicates with the interior of the bushing E by means of a small oblique passage t, formed in the end portion of the bushing, as clearly seen in Figs. 9, 14, and 16. At its outer end the passage T communicates with the interior of the cylinder by a port t', located at such distance from the outer end of the cylinder that it will be uncovered by the plunger B when the latter is near the outward limit of its movement, as seen in Figs. 1 and 2.

Figure 15:
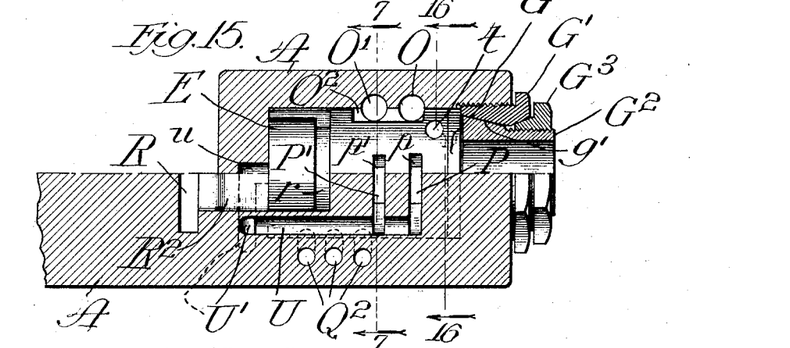
Fig. 15 is a like detail section taken upon the indirect line 15 15 of Fig. 16.
Figures 17, 18:
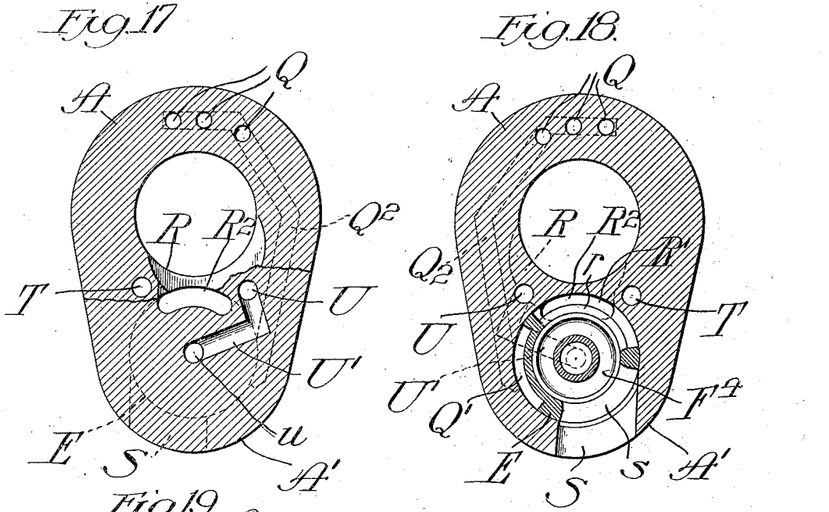
Fig. 17 is a detail cross-section taken upon the line 17 17 of Fig. 4.
Fig. 18 is a detail cross-section taken upon line 18 18 of Fig. 4.

U, Fig. 15, is a second longitudinal passage, which at one end intersects and communicates with the ports P P' and at its opposite end is connected with a transverse passage U', Fig. 17, communicating by a port u with the smaller end of the valve-chamber or the space between the part F⁵ of the valve-piston and the adjacent or outer end of said valve-chamber.

As soon as the port T' is uncovered by the plunger B in its outward movement pressure fluid from the interior of the cylinder will pass through the passage T and, acting on the inner larger end of the piston, will force the same outward, it being understood that the smaller outer end of the valve-piston will be subject to the same pressure; but by reason of said smaller area of the outer end of the valve-piston pressure on the larger end thereof will overcome such pressure on the smaller end. It follows that as the plunger approaches the outward limit of its movement the valve-piston will be shifted to bring the same into position for the admission of the pressure fluid to the outer end of the cylinder and effect the opening of the exhaust-ports R, so as to permit the escape of the exhaust from the inner end of the cylinder in the return stroke of the plunger. As said plunger approaches the inward limit of its stroke it will cover or close the exhaust-port R when it reaches the latter and will thereafter act to compress the air confined within the inner end of the cylinder, which at this time will have no outlet through the controlling-valve, because the ports o o' will be closed by the same. The air confined within the cylinder will be forced through the passage U and, acting on the smaller outer end of the piston, will force the same inwardly. The air which is between the inner larger end of the piston and the plate G at this time is allowed to escape through the passage T and port t' to the interior of the cylinder at the outer end thereof, which may be provided with the usual auxiliary exhaust-ports V V and wherein the pressure will be less than that produced at the inner end of the cylinder through the impact of the plunger against the body of air therein confined.

The operation of the valve described is as follows: When the valve-piston F is at the rearward or inward limit of its stroke, it is in position for admission of the pressure fluid to the inner end of the cylinder and the exhaust of the air from the outer end thereof. At this time air from the throttle-valve enters the valve-chamber through the ports o o' and passes through the grooves f f' to the ports p p' and is thus delivered to the inner end of the cylinder through both the admission-ports P P'. At this time the exhaust from the outer end of the cylinder passes through the passages Q and O² and the port q' to the interior space of the valve-chamber and thence to the exhaust port s. When the plunger in its outward movement passes and uncovers the cylinder-port $t'$, air under pressure from the interior of the cylinder passes through the passage T and acting on the larger inner end of the valve-piston forces the same outward against the like pressure on the smaller outer end of the valve-piston. When the valve-piston is shifted to its outward position, its parts will be in condition for the admission of air to the outer end of the cylinder and the exit of the exhaust from the inner end thereof. At this time air from the supply-passages O O enters the valve-chamber through the port $o^2$ and passes through the grooves $f^2$ of the valve-piston and out through the port $q$ to the passages $Q^2$ and Q, by which it is conducted to the outer end of the cylinder. At this time exhaust from the inner end of the cylinder passes out through the exhaust-port R, passage $R^2$, the port $r$, and the groove $f^2$ of the valve-piston to the exhaust-port $s$. As soon as the plunger in its inward movement passes the exhaust-port R air within the inner end of the cylinder is confined, because the ports $o$ $o'$ are then closed by the enlargements $F'$ $F^2$ of the valve-piston, and the imprisoned air is compressed and driven through the inlet-ports P P' and the passages U U' and, entering the outer end of the throttle-valve chamber through the port $u$, acts upon the smaller outer end of the piston to throw the same inwardly.

An important advantage is gained by providing the valve-piston with the two enlargements $F'$ $F^2$ and associated grooves $f$ $f'$ in connection with the two ports $o$ $o'$ and two cylinder admission-ports P P', for the reason that by this construction a large air-supply is afforded to drive the plunger outward in its working stroke, while the valve-piston has a relatively short stroke. An important advantage is also gained by the construction illustrated, wherein the handle is made integral with the cylinder, and an endwise-reciprocating piston-valve is employed arranged at one side of the inner end of the cylinder, in a valve-casing formed by a lateral extension of the cylinder, for the reason that by this construction I avoid the necessity of employing a special form of connection between the handle and the cylinder, such as is required when the handle is detachably secured to the body of the cylinder to prevent the jarring loose of the handle, while the valve-chamber and valve-piston are brought in such relation to the cylinder that the admission-ports may open directly from the valve-chamber to the inner end of the cylinder. An important advantage is also gained by the location of the endwise-sliding valve-piston and the valve-chamber within a valve-casing formed by a lateral extension of the cylinder and with their central axes parallel with the central axis of the cylinder, for the reason, by this construction the admission-passages leading from the valve-chamber to the inner end of the cylinder may be made short and direct and the passages leading from the cylinder exhaust-port to the valve-chamber, and from the outer end of the cylinder to the valve-chamber may be made of minimum length, with corresponding decrease in clearance-space and compactness of construction.

I claim as my invention—

1. The combination of a cylinder having an integral handle on its inner end and a bore which extends through its said inner end, a plunger in said cylinder, a controlling-valve casing integral with and extending laterally from the inner end of the cylinder and having a bore which is closed at one end by the integral, outer end wall of the casing and opens at its other end through the inner end of the casing, a valve-piston in the said valve-casing having its central axis parallel with the cylinder, and separate closures for the inner end of the bore of the cylinder and for the bore of the valve-casing.

2. The combination of a cylinder having an integral handle on its inner end, and a bore which extends through its said inner end, a plug inserted in the inner end of the bore of the cylinder for closing the same, a plunger in said cylinder, a controlling-valve casing integral with and extending laterally from the inner end of the cylinder, and having a bore which is closed at one end by the integral outer end wall of the casing and opens at its other end through the inner end of the casing, a valve-piston in said valve-casing having its central axis parallel with the cylinder, and a removable closure for the valve-casing inserted and secured in the inner end of the bore thereof.

3. The combination with a cylinder and a plunger therein, of a controlling-valve comprising a valve-casing formed by a lateral extension of the inner end of the cylinder, a bushing located within said casing, a valve-piston within said bushing, a disk bearing against one end of the said bushing forming the end wall of the valve-chamber, and means for holding the said disk in contact with the said bushing, embracing a split thimble having screw-threaded engagement with the valve-casing and bearing on the said disk, a sleeve having a conical surface engaging the conical surface of said thimble and a nut having screw-threaded engagement with said sleeve.

4. The combination with a cylinder and a plunger therein, of a controlling-valve comprising a valve-chamber which is interiorly cylindric throughout the greater part of its length and provided at one end with a part of smaller diameter, and an endwise-reciprocating valve-piston provided at one end with a part of smaller diameter fitting the smaller end of said valve-chamber, said larger part of the valve-chamber being provided with an air-supply port and an admission-port for the inner end of the cylinder, laterally in line with each other, with an air-supply port and an admission-port connected with the outer end of the cylinder, also laterally in line with each other, with an exhaust-port for the inner end of the cylinder and a main exhaust-port also laterally in line with each other, and with an exhaust-port for the outer end of the cylinder and a main exhaust-port also laterally in line with each other, said valve-piston being provided with enlarged parts fitting the larger part of the valve-chamber and with intervening grooves, adapted to coact with said several ports.

5. The combination with a cylinder and a plunger therein, of a controlling-valve chamber provided with two lateral air-supply ports and two lateral air-admission ports communicating with the inner end of the cylinder, the said air-supply and admission ports being located at corresponding distances from the end of the valve-chamber, and an endwise-sliding valve-piston provided with three enlarged parts and two intervening grooves, spaced to correspond with the distance apart of the air-supply and admission ports, and so arranged that in one position of the piston the two grooves therein will stand opposite and establish communication between the two air-supply and the two admission ports and in the other position of the piston two of the enlarged parts thereof will cover or close said air-supply and admission ports.

6. The combination with a cylinder and a plunger therein, of a controlling-valve comprising a valve-chamber provided with a lateral air-supply port, a lateral air-admission port located laterally in line with the air-supply port and communicating with the inner end of the cylinder, a second air-supply port longitudinally separated from the first-named air-supply port, a lateral air-admisison port located laterally in line with the said second supply-port and communicating with the outer end of the cylinder, a lateral air-exhaust port for the outer end of the cylinder, longitudinally separated from the admission-port for the outer end of the cylinder, a lateral exhaust-port for the inner end of the cylinder, longitudinally separated from the exhaust-port for the outer end cf the cylinder, a main exhaust-port, laterally in line with both said exhaust-ports for the outer and inner ends of the cylinder, and an endwise-sliding valve-piston having three enlarged parts and two intervening grooves and so arranged that in one position of said piston one of the grooves will connect with each other the first-named air-supply port and the admission-port for the inner end of the cylinder, one of said enlarged parts will cover the second air-supply port and the admission-port for the outer end of the cylinder and another of said enlarged parts will cover the exhaust-port for the inner end of the cylinder, and in the other position of the piston, one of said enlarged parts will cover the first-named air-supply port and the admission-port for the inner end of the cylinder, one of said grooves will connect with each other the second-named air-supply port and the air-admission port for the outer end of the cylinder, the other of said grooves will connect the exhaust-port for the inner end of the cylinder with the exhaust-port, and another of said enlarged parts will cover the exhaust-port for the outer end of the cylinder.

7. The combination with a cylinder and a plunger therein, of a controlling-valve comprising a valve-chamber provided with three lateral air-supply ports, with two lateral ports communicating with admission-ports at the inner end of the cylinder, with a lateral supply and exhaust port communicating with the outer end of the cylinder, with a lateral port communicating with an exhaust-port for the inner end of the cylinder, and with a lateral main exhaust-port leading to the outer air, the valve-piston being provided with four enlarged parts and intervening grooves or recesses, two of said enlarged parts coacting with two of the air-supply ports, and the two admission-ports, a third enlarged portion which coacts with the third air-supply port, and the admission-port for the outer end of the cylinder, and a fourth enlarged portion which coacts with the exhaust-port for the inner end of the cylinder, with the exhaust-port for the outer end of the cylinder and with the main exhaust-port.

8. The combination with a barrel and a plunger therein, of a controlling-valve comprising a valve-chamber having at one end a port of reduced diameter and provided with three lateral air-supply ports, with two lateral ports communicating with admission-ports at the inner end of the cylinder, with a lateral supply and exhaust port communicating with the outer end of the cylinder, with a lateral port communicating with an exhaust-port for the inner end of the cylinder, and with a lateral main exhaust-port leading to the outer air, and a valve-piston having at one end a part of smaller diameter which fits and slides in the smaller end portion of the valve-chamber and is provided with four enlarged parts and intervening grooves or recesses, two of said enlarged parts coacting with two of the air-supply ports and with the two admission-ports, a third enlarged portion which coacts with the third air-supply port, and with the admission-port for the outer end of the cylinder, and a fourth enlarged portion which coacts with the exhaust-port for the inner end of the cylinder, with the exhaust-port for the outer end of the cylinder and with the main exhaust-port, said cylinder being provided with a passage leading from a point near its outer end to the larger end of the valve-chamber, and with a passage leading from the inner end of said cylinder to the smaller end of said valve-chamber.

In testimony that I claim the foregoing as my invention I affix my signature, in presence of two witnesses, this 11th day of February, A. D. 1905.

REINHOLD A. NORLING.

Witnesses:
C. CLARENCE POOLE,
G. P. WILKINS.